(12) United States Patent
Tsuchiya et al.

(10) Patent No.: US 9,650,943 B2
(45) Date of Patent: May 16, 2017

(54) ROTARY VALVE

(71) Applicant: MIKUNI CORPORATION, Tokyo (JP)

(72) Inventors: Toru Tsuchiya, Odawara (JP); Takumi Oikawa, Odawara (JP); Yoshiyuki Kanesaka, Odawara (JP); Masayuki Daikuhara, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 50 days.

(21) Appl. No.: 14/554,747

(22) Filed: Nov. 26, 2014

(65) Prior Publication Data

US 2015/0075658 A1    Mar. 19, 2015

Related U.S. Application Data

(63) Continuation of application No. PCT/JP2013/064695, filed on May 28, 2013.

(30) Foreign Application Priority Data

May 31, 2012    (JP) .................................. 2012-125530

(51) Int. Cl.
*F16K 5/04*    (2006.01)
*F01P 7/14*    (2006.01)
(Continued)

(52) U.S. Cl.
CPC ........ *F01P 7/14* (2013.01); *F16K 5/04* (2013.01); *F16K 5/0407* (2013.01);
(Continued)

(58) Field of Classification Search
CPC ................. F16K 5/0407; F16K 27/065; Y10T 137/86871
(Continued)

(56) References Cited

U.S. PATENT DOCUMENTS 1,798,473 A * 3/1931 Kiley .................... F16K 27/065
137/596
3,233,865 A * 2/1966 Panzica .................... F16K 5/04
137/625.47
(Continued)

FOREIGN PATENT DOCUMENTS

EP    0 639 736 A1    2/1995
EP    1 529 937 A1    5/2005
(Continued)

OTHER PUBLICATIONS

International Search Report mailed Jul. 9, 2013, in corresponding International Patent Application No. PCT/JP2013/064695.
(Continued)

*Primary Examiner* — Michael R Reid
*Assistant Examiner* — Christopher Ballman (57) ABSTRACT

A rotary valve that includes a rotor and a casing which rotatably accommodates the rotor. The casing includes an inflow side opening through which a fluid flows in from the outside to the rotor accommodating space and two outflow side openings through which the fluid flows out from the rotor accommodating space to the outside, at a position opposite to an outer circumferential surface of the rotor. The rotor is formed in a cylindrical shape having an internal space. An end surface of the rotor is provided with an end surface side opening which communicates with the internal space. The outer circumferential surface of the rotor is provided with a rotor outer circumferential opening and a rotor outer circumferential blocking surface which are configured to open and close the outflow side openings of the casing.

7 Claims, 6 Drawing Sheets

(51) Int. Cl.
*F16K 27/06* (2006.01)
*F16K 11/085* (2006.01)

(52) U.S. Cl.
CPC ........ *F16K 11/0853* (2013.01); *F16K 27/065* (2013.01); *F01P 2007/146* (2013.01); *Y10T 137/86871* (2015.04)

(58) Field of Classification Search
USPC ..................................... 137/625.47; 251/309
See application file for complete search history.

(56) References Cited

U.S. PATENT DOCUMENTS

| | | | | |
|---|---|---|---|---|
| 3,893,469 | A * | 7/1975 | Baker | F16K 5/0626 137/584 |
| 4,140,149 | A * | 2/1979 | Laignel | F16K 5/0407 137/329.01 |
| 4,217,933 | A * | 8/1980 | Perry, Jr. | F16K 11/0833 137/367 |
| 5,349,983 | A * | 9/1994 | Ozarowski | F16K 5/10 137/487.5 |
| 5,617,815 | A * | 4/1997 | Spies | F16K 11/0853 123/41.1 |
| 7,770,867 | B2 * | 8/2010 | Libke | F16K 5/0407 251/209 |
| 7,849,877 | B2 * | 12/2010 | Tan | F16K 11/0853 137/625.46 |
| 8,082,951 | B2 * | 12/2011 | Arsin | F16K 5/0407 137/625.47 |
| 2005/0166964 | A1 * | 8/2005 | Hall | F16K 5/0407 137/351 |
| 2010/0127022 | A1 * | 5/2010 | Valella | F16K 5/0407 222/544 |

FOREIGN PATENT DOCUMENTS

| | | |
|---|---|---|
| FR | 2 923 886 | 5/2009 |
| JP | 4-5570 | 1/1992 |
| JP | 10-9416 | 1/1998 |
| JP | 2000-18039 | 1/2000 |
| JP | 2002-98245 | 4/2002 |
| JP | 2003-286843 | 10/2003 |
| WO | WO 2004/026740 A1 | 4/2004 |
| WO | WO 2004/027269 A2 | 4/2004 |
| WO | WO 2013/176234 A1 | 11/2013 |

OTHER PUBLICATIONS

Extended European Search Report dated Dec. 18, 2015 in corresponding European Patent Application No. 13796741.0 in corresponding European Patent Application No. 13796741.0.

* cited by examiner

ROTARY VALVE

CROSS-REFERENCE TO RELATED APPLICATION(S)

This application is a continuation application, filed under 35 U.S.C. §111(a), of International Application PCT/JP2013/064695, filed on May 28, 2013, which claims the foreign priority benefit of Japanese Patent Application No. 2012-125530, filed May 31, 2012, the disclosures of which are incorporated herein by reference.

BACKGROUND

1. Field

Embodiments of the present invention relate to a rotary valve including a rotor which is rotated to open and close a flow passage.

2. Description of Related Art

In an engine (internal combustion engine) of a vehicle such as an automobile, for the purpose of enhancing the warm-up performance of the engine, enhancing the fuel efficiency by operating the engine at an optimal temperature, and the like, it is considered that a bypass passage through which cooling water bypasses a radiator and is returned to the engine as it is provided separately from a main passage through which the cooling water is circulated between the engine and the radiator, a cooling water control valve is provided in the main passage, and by controlling the opening degree of the cooling water control valve according to the temperature of the cooling water and the other values, the amount of the cooling water which flows through the main passage and is cooled by the radiator is controlled. Note that the cooling water is circulated by a pump driven by the engine, and during an operation of the engine, the cooling water is mainly circulated through the main passage in a case where the cooling water control valve is opened, and is circulated through the bypass passage in a case where the cooling water control valve is closed.

For example, during the start-up of the engine at a low cooling water temperature, the main passage is blocked to allow the cooling water to return to the engine as it is from the bypass passage without passing through the radiator, thereby accelerating the warm-up of the engine. In addition, for example, in order to control the temperature of the cooling water to optimize the combustion of a fuel in the engine even after the warm-up, opening and closing (the opening degree) of the cooling water control valve is adjusted.

In the cooling water control valve, the use of a rotary valve or the like is considered (for example, see Patent Literature 1).

In addition, a rotary valve has been proposed which is not the above-described valve for cooling water but is a valve used in an automobile (for example, see Patent Literature 2 and Patent Literature 3).

In a rotor of such a rotary valve, a flow passage for connecting an end surface to an outer circumferential surface of the rotor is provided therein, the rotor is rotated to move a position of the opening on the outer circumferential surface side of the rotor in the flow passage in a circumferential direction, and thus the valve is opened and closed.

Basically, an inside diameter of the flow passage provided in the rotor is substantially equal to a diameter of a connection part with an external flow passage, and, for example, is smaller than two thirds of an outer diameter of the rotor. That is, the passage having a diameter substantially equal to that of an inflow port and an outflow port of the valve is provided in the rotor, and the diameter of the rotor is quite large relative to the diameter of the flow passage.

PATENT LITERATURE

Patent Literature 1: Japanese Publication No. 2002-98245 A

Patent Literature 2: Japanese Publication No. 2001-159471 A

Patent Literature 3: Japanese Publication No. 2011-149465 A

SUMMARY

However, in the rotor of each of the rotary valves described above, a tunnel-like flow passage or a groove-like flow passage is formed inside the rotor toward the outflow side from the inflow port side. For example, since the flow passage of the above-described engine for the cooling water requires a relatively high flow rate, if the diameter of the flow passage of the rotor is enlarged to increase the flow rate of the rotary valve, the diameter of the rotor becomes larger.

Furthermore, one flow passage is formed inside the rotor in Patent Literatures 2 and 3, whereas two groove-like flow passages are provided in the rotor in Patent Literature 1. However, in Patent Literature 1, two flow passages are separately and independently provided in the rotor, and thus the diameter of the rotor becomes further larger.

Further, in the rotary valves described above, the valve is opened and closed due to the movement of an opening on the outer circumferential surface of the rotor and a blocking surface serving as a non-opening. For example, when the opening of the flow passage provided on the outer circumferential surface of the rotor and an opening formed in a cylindrical casing surrounding the periphery of the rotor are overlapped with each other, the valve is opened, for example, the cooling water flows toward the flow passage on the casing side from the flow passage on the rotor side. Even in this case, when a high flow rate is ensured, it is necessary to increase the size of the opening on the rotor outer circumferential surface.

In this case, it is necessary to enlarge the outer circumferential surface of the rotor, for example, it is necessary to lengthen the circumferential length of the rotor. As the circumferential length of the rotor lengthens, it is necessary to increase the diameter of the rotor. Accordingly, when the diameter of the rotor increases, the rotary valve provided with the rotor is enlarged as a whole.

For example, in the case of using such a rotary valve in a small engine for controlling the cooling water described above, if the flow rate of the cooling water passing through the rotary valve is increased as described above, the diameter of the rotor of the rotary valve becomes large as described above, and thus an occupied volume of the rotary valve becomes large.

In the small engine, a space in which members are fitted in the periphery thereof is limited. Therefore, it is difficult to dispose the rotary valve, which will become large in the occupied volume as described above, in the small engine. That is, it is difficult to use the rotary valve in the flow passage for cooling water of the small engine.

Embodiments of the present invention have been made taking the forgoing circumstances into consideration, and an object thereof is to provide a rotary valve that can be reduced in size while ensuring a high flow rate.

In order to achieve the object, a rotary valve includes a rotor which is rotated to open and close a flow passage and a casing which accommodates the rotor, wherein the casing is provided with a rotor accommodating space which rotatably accommodates the rotor and includes at least one inflow side opening through which a fluid flows in from the outside to the rotor accommodating space and at least one outflow side opening through which the fluid flows out from the rotor accommodating space to the outside, respectively at a position opposite to an outer circumferential surface of the rotor, the rotor is formed in a cylindrical shape having an internal space, an end surface of the rotor is provided with an end surface side opening which communicates with the internal space, and the outer circumferential surface of the rotor is provided with a rotor outer circumferential opening which communicates with one opening of the inflow side opening and the outflow side opening of the casing when being opposite to the one opening and a rotor outer circumferential blocking surface which blocks the one opening when being opposite to the one opening, an interval is formed between the outer circumferential surface of the rotor and an inner circumferential surface of the casing which opposes the outer circumferential surface, excluding the one opening which is blocked by the rotor outer circumferential blocking surface of the rotor, such that the fluid can flow through the interval, and an interval is formed between the end surface of the rotor and the casing such that the fluid can flow in from the end surface opening to the rotor or can flow out from the rotor.

In the above configuration, it is preferable that the rotor outer circumferential blocking surface may block the inflow side opening, and the outflow side opening may have an area larger than an area obtained by projecting the rotor onto the outflow side opening and be normally opened regardless of a rotation angle of the rotor.

In addition, the casing may include the one inflow side opening and the two outflow side openings, the rotor may include the one rotor outer circumferential opening which has a length in a circumferential direction to be capable of opening the two outflow side openings at the same time and the rotor outer circumferential blocking surface which has a length in a circumferential direction to be capable of closing the two outflow side opening at the same time.

According to the embodiments, when the rotation angle of the rotor is set such that the rotor outer circumferential blocking surface of the rotor is disposed at a position overlapped with one of the inflow side opening and the outflow side opening of the casing, one opening is closed by the rotor outer circumferential blocking surface, the flow passage from the inflow side opening to the outflow side opening is closed, and thus the rotary valve is in a closed state.

In addition, when one opening of the casing and the rotor outer circumferential opening of the rotor are overlapped with each other, the rotary valve is opened, and the fluid flows toward the outflow side opening from the inflow side opening of the casing.

Furthermore, in the state where the fluid flows, since an interval is formed between the rotor and the casing in a part other than one opening of the inflow side opening and the outflow side opening, when the other opening is the inflow side opening, the fluid can flow in from the inflow side opening to the inside of the casing. In addition, when the other opening is the outflow side opening, the fluid can flow out from the outflow side opening to the inside of the casing.

In this case, the fluid can flow between the outer circumferential surface of the rotor and the inner circumferential surface of the casing and the fluid can also flow between the end surface opening of the rotor and the rotor outer circumferential surface opening (in the rotor). Accordingly, the fluid can flow in both sides of the outside and the inside of the rotor in the casing, and the fluid can flow at a high flow rate relative to the size of the rotor. In addition, since the rotor has the cylindrical shape, the internal space thereof is wide, and the fluid can flow at the high flow rate to the inside of the rotor.

Therefore, the size of the rotor can be effectively enlarged. That is, as the size of the rotor is enlarged in order to increase the flow rate, the rotary valve is suppressed from being enlarged, the rotary valve for performing the opening and closing of the high flow rate is reduced in size, and, for example, the rotary valve can be effectively used as a valve for the cooling water control or other uses of the small engine.

In addition, when one opening is the outflow side opening, the outflow side opening is opened and closed by the rotor outer circumferential opening of the rotor and the rotor outer circumferential blocking surface. In this case, when the other opening having the interval with respect to the rotor is the inflow side opening and the interval is formed between the other opening and the rotor, the fluid is in the state of being normally capable of flowing in regardless of the rotation angle of the rotor.

Furthermore, when the area of the inflow side opening is larger than the area obtained by projecting the rotor onto the opening, the inflow side opening may not be blocked by the rotor outer circumferential blocking surface of the rotor, the inflow side opening can be normally opened in this way also, and the fluid can flow at the high flow rate in the inflow side opening when the outflow side opening is opened. In this way, the fluid can effectively flow at the high flow rate in the rotary valve.

In addition, since two outflow side openings are provided and, with respect to the two outflow side openings, the rotor is provided with the rotor outer circumferential opening which is capable of opening two outflow side openings at a time and has the length in the circumferential direction and the outer circumferential blocking surface which is capable of closing two outflow side openings at a time and has the length in the circumferential direction, it is possible to open and close two outflow side opening at the same time.

Furthermore, when the rotation angle of the rotor is a rotation angle at which a boundary between the rotor outer circumferential opening and the rotor outer circumferential blocking surface is disposed between two outflow side openings, one outflow side opening can be opened and the other outflow side opening can be closed.

That is, since one rotor outer circumferential opening is provided on the outer circumferential surface of the rotor and the boundaries with the rotor outer circumferential blocking surface exist in left and right of the rotor outer circumferential opening, it is possible to set to be in the state where one outflow side opening is opened and the other outflow side opening is closed and to be in the state where one outflow side opening is closed and the other outflow side opening is opened. In order to minimize the diameter of the rotor, preferably, a substantially half of the outer circumferential surface of the rotor is set to be the rotor outer circumferential opening and the other substantially half thereof is set to be rotor outer circumferential blocking surface.

Furthermore, in the case of opening and closing two outflow side openings with the rotor, the fluid flows into two flow passages. However, at this time, the flow passages are not separated into two parts inside the rotor or in a space between the rotor and the casing, the fluid flows out to each of two outflow side openings, and thus the fluid separately flows into two flow passages. Therefore, the flow passages are not separated and are formed as one flow passage in the casing, and thus a space available as the flow passage may not reduced due to a structure for dividing the flow passages nor may the fluid flow be inhibited.

BRIEF DESCRIPTION OF DRAWINGS

These and/or other aspects and advantages will become apparent and more readily appreciated from the following description of the embodiments, taken in conjunction with the accompanying drawings of which.

DESCRIPTION OF EMBODIMENTS

Hereinafter, embodiments of the present invention will be described with reference to the drawings.

A rotary valve is used, for example, to control cooling water of the engine of a vehicle, and in an engine cooling system which includes a main flow passage that is mounted on a water jacket of the engine to circulate the cooling water between the water jacket and a radiator, a sub-flow passage which supplies the cooling water to a device (for example, a heater or a throttle) that needs temperature adjustment using the cooling water, and a bypass flow passage that bypasses the radiator, the rotary valve is used to open and close the main flow passage and the sub-flow passage.

As illustrated in FIGS. 1 to 6, the rotary valve includes a rotor 1, a casing 2 which rotatably accommodates the rotor 1, a rotation driving device 3 which drives the rotor 1 to rotate, a main connection member 5 which includes a main connection pipe 4 that is connected to the main flow passage and causes the cooling water (fluid) to flow out, and a sub-connection member 7 which includes a sub-connection pipe 6 that is connected to the sub-flow passage and causes the cooling water to flow out.

The rotor 1 includes a cylindrical rotating shaft 11 which is thin and long, a cylindrical portion 12 which is formed in a thick cylindrical shape centered on the rotating shaft 11, and spoke portions 13 which have shapes that extend in four directions from the rotating shaft 11 along the radial direction of the cylindrical portion 12 at both end portions of the cylindrical portion 12 in the axial direction thereof and are connected to the cylindrical portion 12. Note that the number of spoke portions 13 is not limited to four as four sides, but may be not more than or not less than four.

Right and left end surface parts of the rotor 1 are formed as the spoke portions 13 which have shapes that extend from the above-described rotating shaft 11 in the four directions, and thus there are openings between the parts that extend in the four directions. Therefore, four openings (end surface side openings) 14 are respectively provided in the right and left end surfaces of the rotor 1, and the area occupied by the openings 14 is larger than the area occupied by the spoke portions 13 at the end surfaces of the rotor 1.

In addition, the end portions of the rotating shaft 11 respectively protrude from both the end surfaces of the rotor 1.

In the outer circumferential surface of the rotor 1 (the cylindrical portion 12), a rotor outer circumferential opening 15 having a circumferential length of a substantially half (slightly shorter than the half) of the outer circumferential surface is provided. Both the end portions of the rotor outer circumferential opening 15 in the circumferential direction are formed in a semicircular shape. In addition, the length of the width of the rotor outer circumferential opening 15 along the axial direction of the rotor 1 is equal to or greater than the half of the length of the rotor 1 along the axial direction, and for example, equal to or greater than two thirds thereof.

In addition, the rotor outer circumferential opening 15 of the outer circumferential surface of the rotor 1 is provided in the cylindrical portion 12 of the rotor 1, and penetrates through the cylindrical portion 12 so that the inside and the outside of the rotor 1 (the cylindrical portion 12) communicate with each other.

Furthermore, a part of the outer circumferential surface of the rotor 1 (the cylindrical portion 12) excluding the rotor outer circumferential opening 15 is a rotor outer circumferential blocking surface 16 which is an outer circumferential surface with no opening. Here, the length of the rotor outer circumferential opening 15 along the circumferential direction of the outer circumferential surface of the rotor 1 is a substantially half of the length of the entire circumference, and the length of the rotor outer circumferential blocking surface 16 with no opening is a substantially half of the length along the circumferential direction of the outer circumferential surface of the rotor 1.

The casing 2 is formed substantially in a hexahedron (rectangular parallelepiped) box shape, two surfaces among the six surfaces of the casing which oppose each other have inner surfaces that oppose the end surfaces of the rotor 1, and the other four surfaces have inner surfaces that oppose the outer circumferential surface of the rotor. Here, plate-like portions which respectively form the surfaces of the hexahedron are referred to as a first plate-like portion 21 to a sixth plate-like portion 26.

The plate-like portions having inner surfaces that oppose the end surfaces of the rotor 1 are referred to as the first plate-like portion 21 and the second plate-like portion 22, and the plate-like portions having inner surfaces that oppose the outer circumferential surface of the rotor 1 are referred to as the third plate-like portion 23 to the sixth plate-like portion 26.

The rotation driving device 3 is mounted on the first plate-like portion 21 which is one of the first plate-like portion 21 and the second plate-like portion 22. A hole 21*a* into which the rotor 1 can be inserted is provided in the first plate-like portion 21. In contrast, the rotation driving device 3 is provided with a lid portion 31 for blocking the hole 21*a* and a driving shaft 32 for penetrating through the lid portion 31 in a state of being sealed.

The rotation driving device 3 is provided with, for example, a motor which rotates the driving shaft 32 therein. The driving shaft may be directly connected to the motor or may be connected to the motor via a decelerator. The driving shaft 32 is connected to one end portion of the rotating shaft 11 of the rotor 1. The other end portion of the rotating shaft 11 is rotatably supported by a bearing hole 22a of the second plate-like portion 22 as described below.

The second plate-like portion 22, which is opposite to the first plate-like portion 21 and is disposed in parallel with the first plate-like portion 21, is provided with the bearing hole 22a rotatably supporting the other end of the rotating shaft 11 of the rotor 1. The bearing hole 22a is formed as a hole in which one side is closed within a protruding portion which protrudes toward an outer surface side of the second plate-like portion 22 without penetrating through the second plate-like portion 22.

The other end of the rotating shaft 11 of the rotor 1 is rotatably inserted into and supported by the bearing hole 22a.

The third plate-like portion of which the inner surface opposes the outer circumferential surface of the rotor 1 is provided so that the outer circumferential part thereof extends outward in a flange shape to serve as a flange portion 23b connected to the jacket of the engine, but almost the entire inner circumferential portion surrounded by the first plate-like portion 21, the second plate-like portion 22, the fourth plate-like portion 24, and the sixth plate-like portion 26 is an opening 23a.

When the flange portion 23b is mounted to a mounting position having an opening of the jacket, the opening 23a is overlapped with the opening of the jacket and acts as an inflow side opening 23a into which cooling water in the jacket flows.

The opening 23a can be formed substantially in the maximum area on the third plate-like portion 23 constituting one surface of the hexahedral casing 2 for accommodating the rotor 1. The third plate-like portion 23 includes the opening 23a and the flange portion 23b.

In addition, the area of the opening 23a conforms with the rotating shaft 11 of the rotor 1 of the rotor accommodating space 2a within the casing 2 which accommodates the rotor 1 and is substantially similar to an area of a cross section parallel to the third plate-like portion 23.

Accordingly, the area of the opening 23a becomes larger than an area (cross-section area along the center of the rotating shaft 11) which is formed by projecting the rotor 1 smaller than the rotor accommodating space 2a onto the third plate-like portion 23.

The fourth plate-like portion 24 has a surface with no opening.

The sub-connection member 7 described above is mounted on the outer surface of the fifth plate-like portion 25. The fifth plate-like portion 25 is provided with an opening 25a which communicates with the sub-connection pipe 6 of the sub-connection member 7.

The opening 25a is an outflow side opening 25a which allows the cooling water to flow out to the outside from the rotary valve. The cooling water flowing out from the opening 25a circulates through a sub-flow passage (for example, including a heater or the like) and is returned to the jacket from a pump.

The fifth plate-like portion 25 is disposed to oppose and be parallel to the third plate-like portion 23 having the inflow side opening 23a and is disposed to be substantially perpendicular to the sixth plate-like portion 26 and the fourth plate-like portion 24.

The above-mentioned main connection member 5 is mounted on the outer surface of the sixth plate-like portion 26. The sixth plate-like portion 26 is provided with an opening 26a which communicates with the main connection pipe 4 of the main connection member 5. The opening 26a is the opening 26a on the outflow side through which the cooling water flows out from the rotary valve to the outside. The cooling water which flows out from the opening 26a is circulated through the radiator and is returned to the jacket from the pump.

The fifth plate-like portion 25 and the sixth plate-like portion 26 are adjacent to each other and are disposed to be perpendicular to each other, and the opening 25a of the first plate-like portion 25 and the opening 26a of the sixth plate-like portion 26 are disposed such that axial centers thereof are substantially orthogonal to each other. In addition, the fifth plate-like portion 25 and the sixth plate-like portion 26 cover a substantially half (the range of about 180 degrees) of the outer circumferential surface of the rotor 1, and the third plate-like portion 23 and the fourth plate-like portion 24 cover the other approximately half (the range of about 180 degrees) of the outer circumferential surface of the rotor 1.

Furthermore, a second interval 42 is formed between the lid portion 31 covering the first plate-like portion 21 and the opening 21a of the first plate-like portion 21 and the end surface of the rotor 1 and between the second plate-like portion 22 and the end surface of the rotor 1 such that fluid (cooling water) flows. The second interval 42 is not a narrow interval of a state in which the fluid permeates but is an interval through which the fluid sufficiently flows. In addition, for example, the second interval 42 is larger than the presumed maximum diameter of foreign matter in a state of being mixed into the cooling water, so that the foreign matter mixed into the cooling water is prevented from being stuck between the end surface of the rotor 1 and the inner surface of the casing 2.

In addition, first interval 41 between each inner surface of the third plate-like portion 23 to the sixth plate-like portion 26 opposite to the outer circumferential surface of the rotor 1 and the outer circumferential surface of the rotor 1 is also formed such that the fluid can sufficiently flow. Further, the first interval 41 is larger than the presumed maximum diameter of the above-mentioned foreign matter, so that the foreign matter is prevented from being stuck between the outer circumferential surface of the rotor 1 and the inner surface of the casing 2.

In addition, the outflow side opening 25a of the fifth plate-like portion 25 is provided with a seal member 25b protruding toward the outer circumferential surface of the rotor 1 from the fifth plate-like portion 25. The seal member 25b is an elastic body made of a rubber-like member such as synthetic rubber. The seal member 25b is a cylindrical member and is formed such that a tip thereof is shaped along the outer circumferential surface of the rotor 1. That is, the tip of the seal member 25b has an annular shape and a shape recessed in an arc shape in the circumferential direction of the rotor 1.

In addition, an inside diameter of the cylindrical seal member 25b has a length which is substantially equal to the above-mentioned width of the rotor outer circumferential opening 15 of the rotor 1.

Furthermore, an elastic member such as, for example, a metal plate is disposed on a rear end side of the seal member 25b and biases the seal member 25b toward the rotor 1.

In a state where the rotor outer circumferential blocking surface 16 on the outer circumferential surface of the rotor 1 comes in contact with the entire tip of the seal member 25b, the opening on the inner circumferential side of the seal member 25b is in a closed state, the fluid is prevented from being flown out from the opening 25a of the fifth plate-like portion 25, and the rotary valve is in a closed state with respect to the sub-flow passage.

In addition, when the opening of the seal member 25b and at least a part of the rotor outer circumferential opening 15 of the rotor 1 are in a state of being overlapped with each other, the rotary valve is in an opened state with respect to the sub-flow passage and the fluid is in a state of flowing out to the sub-flow passage. In this case, the fluid flows in from the opening 23a of the third plate-like portion 23 having the larger area than the rotor 1 as described above and flows out to the sub-flow passage through the sub-connection pipe 6 via the opening 25a from the rotor outer circumferential opening 15 after being introduced into the rotor 1 from the opening 14 on the end surface of the rotor 1. Further, the fluid can flow between the outer circumferential surface of the rotor 1 and the inner surface of the casing 2 and flow out to the sub-flow passage via the opening 25a.

In addition, the outflow side opening 26a of the sixth plate-like portion 26 is provided with a seal member 26b protruding toward the outer circumferential surface of the rotor 1 from the sixth plate-like portion 26. The seal member 26b is a rubber-like member such as synthetic rubber and is the same member as the seal member 25b.

Furthermore, an elastic member such as, for example, a metal plate is disposed on a rear end side of the seal member 26b and biases the seal member 26b toward the rotor 1.

In a state where the rotor outer circumferential blocking surface 16 on the outer circumferential surface of the rotor 1 comes in contact with the entire tip of the seal member 26b, the opening on the inner circumferential side of the seal member 26b is in a closed state, the fluid is prevented from being flown out from the opening 26a of the sixth plate-like portion 26, and the rotary valve is in a closed state with respect to the main flow passage.

In addition, when the opening of the seal member 26b and at least a part of the rotor outer circumferential opening 15 of the rotor 1 are in a state of being overlapped with each other, the rotary valve is in an opened state with respect to the main flow passage and the fluid is in a state of flowing out to the main flow passage. In this case, the fluid flows in from the opening 23a of the third plate-like portion 23 having the larger area than the rotor 1 as described above and flows out to the main flow passage through the main connection pipe 4 via the opening 26a from the rotor outer circumferential opening 15 after being introduced into the rotor 1 from the opening 14 on the end surface of the rotor 1. Further, the fluid can flow between the outer circumferential surface of the rotor 1 and the inner surface of the casing 2 and flow out to the main flow passage via the opening 26a.

Figure 1:
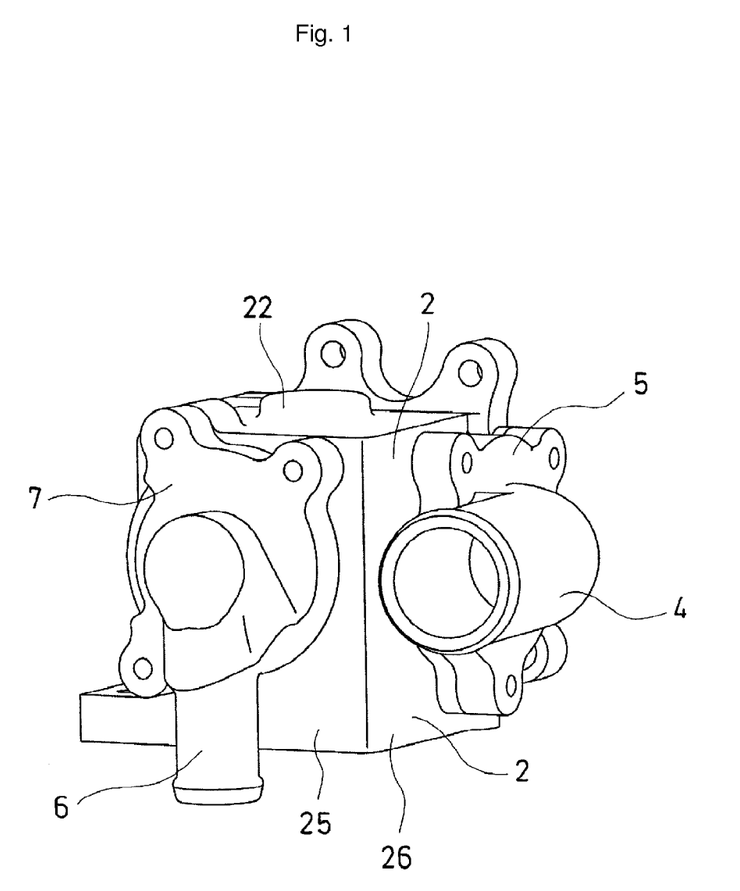
FIG. 1 is a perspective view illustrating a rotary valve of an embodiment.
Figure 2:
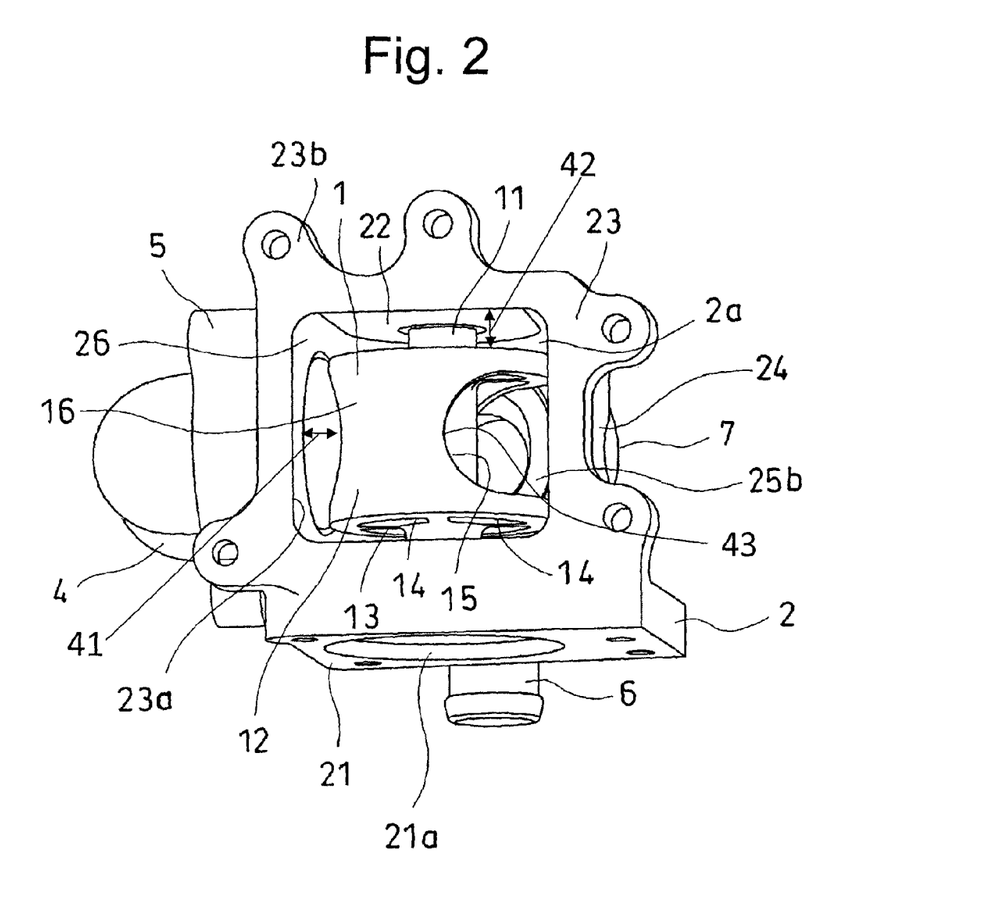
FIG. 2 is a perspective view illustrating the rotary valve.
Figure 3:
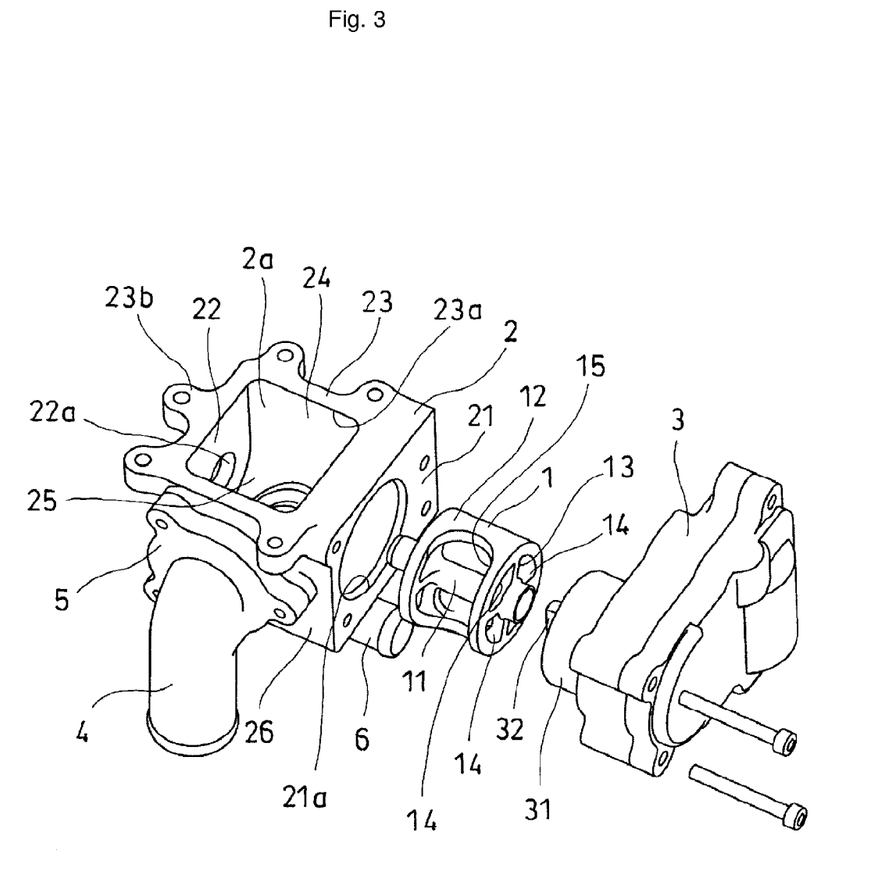
FIG. 3 is an exploded perspective view illustrating the rotary valve.
Figure 4:
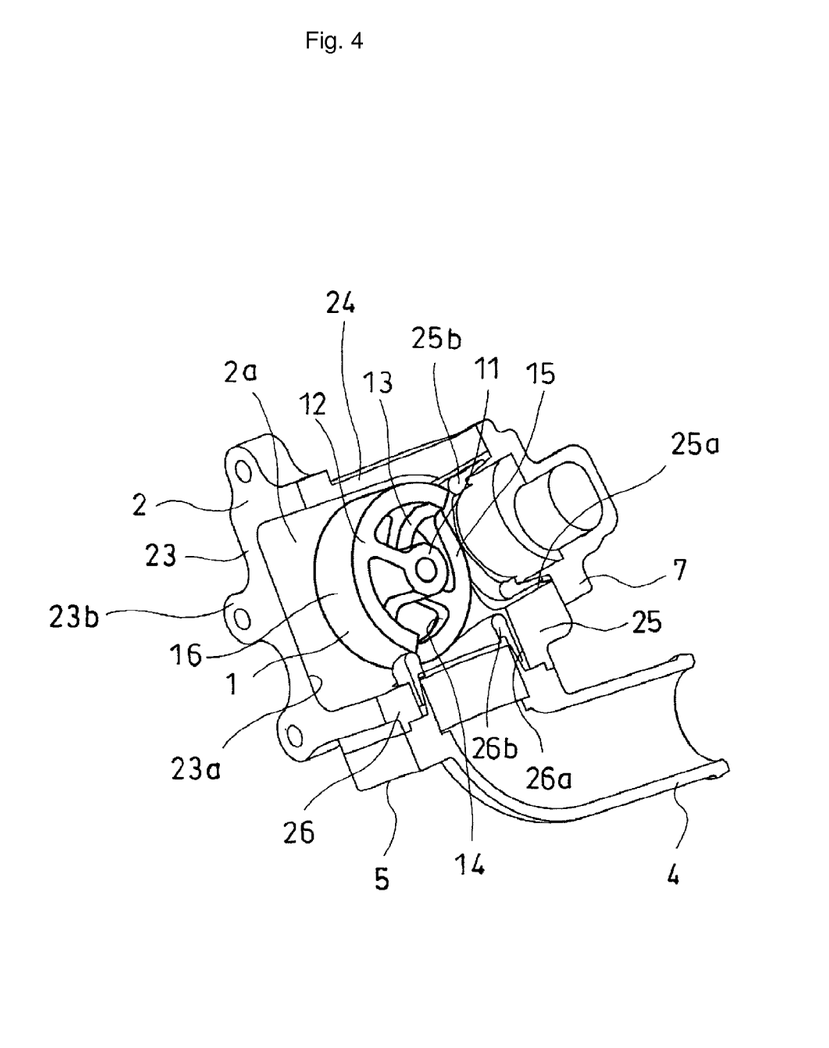
FIG. 4 is a partially cutaway perspective view illustrating the rotary valve.

Furthermore, as illustrated in FIG. 4, the rotor outer circumferential opening 15 of the rotor 1 can be simultaneously overlapped with both of the outflow side opening 26a at the main flow passage side of the casing 2 and the outflow side opening 25a at the sub-flow passage side of the casing 2 which are adjacent to each other at the outer circumferential surface side of the rotor 1. In this case, the fluid flowing in from the inflow side opening 23a can flow out to both of the main flow passage and the sub-flow passage at the same time.

Figure 6:
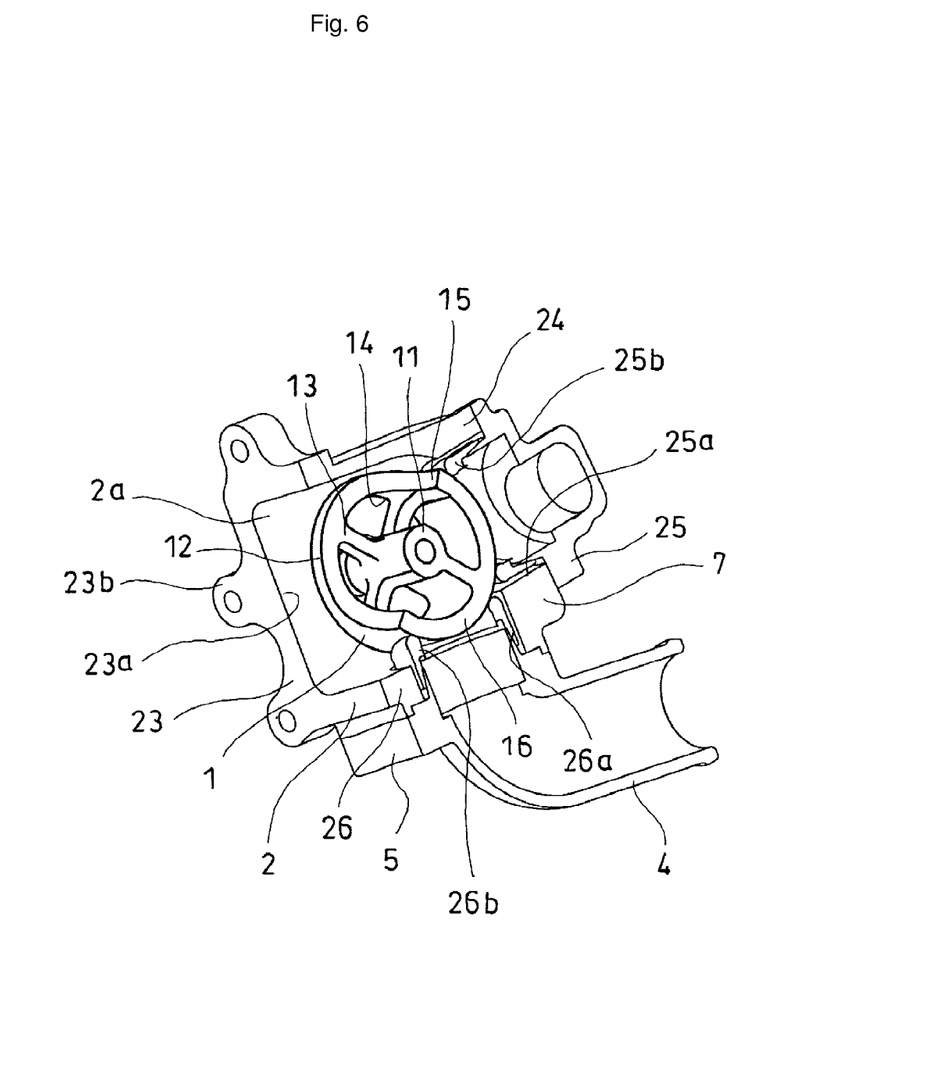
FIG. 6 is a partially cutaway perspective view illustrating the rotary valve.

In addition, as illustrated in FIG. 6, the rotor outer circumferential blocking surface 16 of the rotor 1 can be simultaneously overlapped with both of the opening 26a at the main flow passage side of the casing 2 and the opening 25a at the sub-flow passage side of the casing 2 which are adjacent to each other at the outer circumferential surface side of the rotor 1. In this case, both the main flow passage and the sub-flow passage can be closed at the same time to stop the outflow of the fluid to both of the main flow passage and the sub-flow passage.

Figure 5:
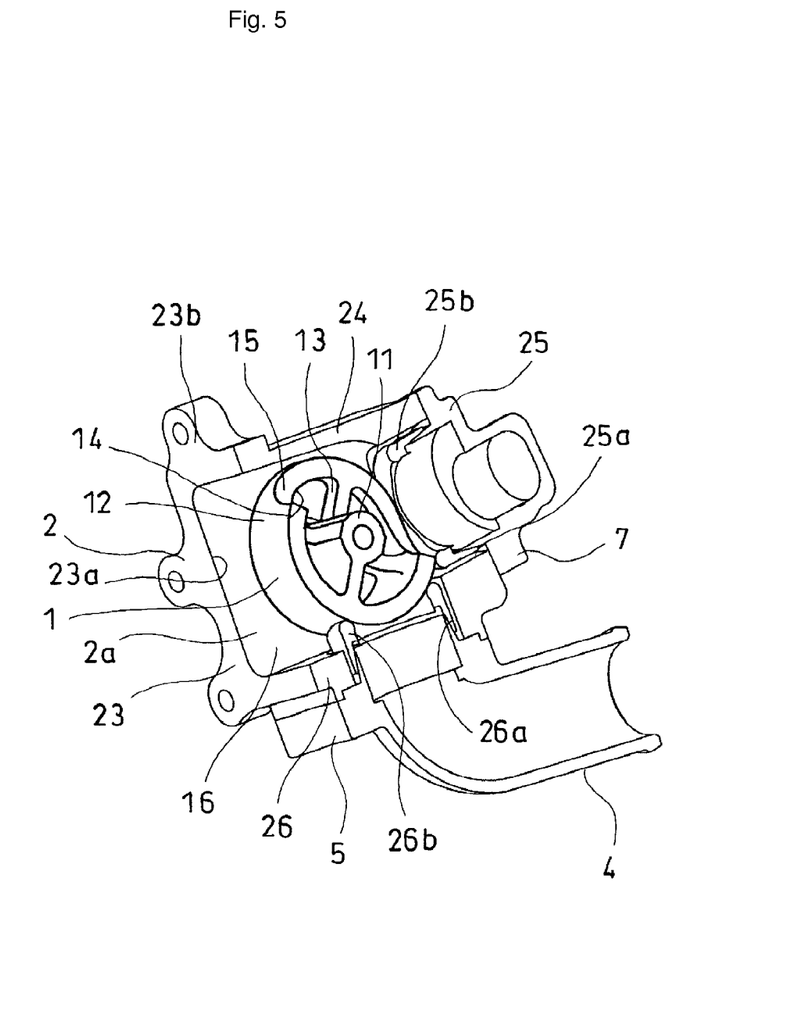
FIG. 5 is a partially cutaway perspective view illustrating the rotary valve.

Furthermore, as illustrated in FIG. 5, the rotor 1 is rotated counterclockwise by 90 degrees in the drawing from the state illustrated in FIG. 4, so that the rotor outer circumferential opening 15 can be in a state of being overlapped with the opening 25a of the fifth plate-like portion 25 of the casing 2 and the rotor outer circumferential blocking surface 16 can be in a state of being overlapped with the opening 26a of the sixth plate-like portion 26 of the casing 2.

In this case, the opening 26a on the main flow passage side is in a closed state and the opening 25a on the sub-flow passage side is in an opened state, and thus the fluid can be prevented from flowing out to the main flow passage and the fluid can be flow out toward the sub-flow passage. In this case, a boundary part 43 between the rotor outer circumferential opening 15 and the rotor outer circumferential blocking surface 16 of the rotor 1 is in a state of being disposed between the opening 25a and the opening 26a of the casing 2.

Furthermore, conversely, although not illustrated, the rotor 1 is rotated clockwise by 90 degrees in the drawing from the state illustrated in FIG. 4, so that the rotor outer circumferential opening 15 can be in a state of being overlapped with the opening 26a of the sixth plate-like portion 26 of the casing 2 and the rotor outer circumferential blocking surface 16 can be in a state of being overlapped with the opening 25a of the fifth plate-like portion 25 of the casing 2.

In this case, the opening 26a on the main flow passage side is in an opened state and the opening 25a on the sub-flow passage side is in a closed state, and thus the fluid can be prevented from flowing out to the sub-flow passage and the fluid can be flow out toward the main flow passage.

In this rotary valve, as described above, the opening 23a on the inflow port side is larger than the area obtained by projecting the rotor 1 and the third plate-like portion 23 having the opening 23a is distant from (largely spaced from) the rotor 1, and thus the fluid can flow in to the casing 2 from the opening 23a even either of the rotor outer circumferential opening 15 or the rotor outer circumferential blocking surface 16 of the rotor 1 is provided toward the opening 23a.

In addition, since the rotor 1 has the cylindrical shape and the inside and outside thereof can be used as the flow passage of the fluid, it is possible to ensure a large flow rate even though the diameter of the rotor 1 is small. That is, it is possible to reduce the diameter required for the rotor 1 relative to the conventional one with respect to the required maximum flow rate.

In addition, even though the rotor outer circumferential blocking surface of the rotor 1 is disposed to block a space between the inflow side opening 23a and the outflow side openings 25a and 26a, when the rotor outer circumferential opening 15 is in the state of being overlapped with the outflow side openings 25a and 26a, the fluid flows outside the rotor 1 or inside of the rotor 1 toward the rotor outer circumferential opening 15 of the rotor 1 from the opening 14 provided on the end surface of the rotor 1 as described above, and thus it is possible to ensure sufficient flow rate even if the diameter of the rotor 1 is small.

In the rotary valve, for example, in the case where the casing part for accommodating the rotor has the cylindrical shape, a clearance between the inner circumferential surface of the casing and the outer circumferential surface of the rotor is in a small state, one or more inflow side openings and outflow side openings are each provided on the inner circumferential surface of the casing, one or more inflow side openings and outflow side openings are each provided also on the outer circumferential surface of the rotor, and the flow passage from the inflow side opening to the outflow side opening provided on the rotor is provided in the rotor, it is necessary to dispose each of the openings such that the outflow side opening of the casing and the outflow side opening of the rotor side are overlapped with each other, when the inflow side opening of the casing and the inflow opening on the rotor side are overlapped with each other. Further, in the case of closing the valve, it is necessary to have a structure in which the opening on the casing side is blocked by the outer circumferential surface of the rotor which is not provided with the opening.

In this case, it is necessary for the outer circumferential surface of the rotor to include the blocking surface which has an area capable of blocking the opening on the casing side and is not provided with the opening, as well as the inflow side opening and the outflow side opening. Therefore, when these are juxtaposed in the circumferential direction on the outer circumferential surface of the rotor, it is necessary to increase the circumferential length of the rotor, and thus the diameter of the rotor is increased.

In this embodiment, if the rotor 1 includes the rotor outer circumferential blocking surface 16 which has the circumferential length and can block the openings 25a and 26a on the outflow side and the rotor outer circumferential opening 15 which can be overlapped with two openings 25a and 26a, the fluid can flow without problems even when the rotor outer circumferential blocking surface 16 faces the opening 23a side on the inflow side of the casing 2 in the state where the rotor outer circumferential opening 15 is overlapped with the openings 25a and 26a of the casing 2.

That is, since it is not necessary to further provide the opening overlapped with the opening 23a on the inflow side of the casing 2 in the state where the rotor outer circumferential opening 15 is overlapped with the openings 25a and 26a of the casing 2, the circumferential length of the rotor 1 can be shortened to that extent and thus the diameter of the rotor 1 can be reduced. Note that if one of the openings 25a and 26a on the outflow side is provided, the length of the rotor 1 in the circumferential direction can be further shortened and thus the diameter of the rotor 1 can be reduced.

In addition, conversely, even when the number of openings on the outflow side is increased up to three or more, since the rotor 1 need not be provided with the opening on the inflow side, it is possible to suppress an increase in diameter of the rotor 1. That is, it is possible to provide two or three openings on the outflow side without significantly increasing the diameter of the rotor 1.

Furthermore, the plurality of outflow side openings can correspond to each other at one rotor outer circumferential opening of a longer circumferential length and the configuration of the rotor 1 can be simplified.

The above-described embodiment is configured such that the outflow side openings 25a and 26a are provided with the seal members 25b and 26b, the rotor outer circumferential blocking surface 16 covers the openings of the seal member 25b and 26b, and thus outflow side openings 25a and 26a are blocked, but may be configured such that the inflow side opening 23a is provided with the seal member and the inflow side opening 23a is blocked by the rotor outer circumferential blocking surface.

In this case, two openings 25a and 26a on the outflow side are difficult to individually open and close, but since the rotor only needs to have the blocking surface capable of blocking the inflow side opening 23a and the opening capable of opening the inflow side opening 23a, the diameter of the rotor can be reduced. Thus, it is possible to obtain a structure in which driving torque of the rotor is easily reduced. If the driving torque can be reduced, it is possible to realize reduction in cost and size of the driving device. In addition, it is possible to reduce the diameter of the rotor and miniaturize the rotary valve.

Further, in the above-described embodiment, the rotor 1 is provided with one rotor outer circumferential opening 15 of a longer circumferential length, and two outflow side openings 25a and 26a are juxtaposed on the casing 2 side in the circumferential direction of the rotor 1. In contrast, there may be a configuration in which the rotor 1 becomes longer in the axial direction, two openings are juxtaposed in the axial direction of the longer rotor 1, as the rotor outer circumferential opening, and two outflow side openings are juxtaposed on the casing 2 side along the axial direction of the rotor 1.

Even in such a configuration, two outflow side openings can be opened and closed by the rotation of the rotor, two outflow side openings can be fully opened and fully closed depending on the arrangement of each opening on the rotor side or the circumferential length of each opening on the rotor side as described above, and two openings may have a different degree of opening.

In this case, the length of the rotor 1 in the axial direction becomes longer, but the size thereof can be reduced in a radial direction. Further, as the diameter of the rotor is reduced, it is possible to form a structure in which the driving torque of the rotor 1 is easily reduced as described above. It is possible to realize reduction in cost and size of the driving device by reducing the driving torque.

DESCRIPTION OF REFERENCE CHARACTERS 1 rotor
14 opening (end surface side opening)
15 rotor outer circumferential opening
16 rotor outer circumferential blocking surface
2 casing
2a rotor accommodating space
23a opening (inflow side opening)
25a opening (outflow side opening)
26a opening (outflow side opening)
14 opening (end surface side opening)

What is claimed is:
1. A rotary valve comprising:
a rotor that is rotated to open and close a flow passage; and
a casing that accommodates the rotor,
wherein the casing is provided with a rotor accommodating space that rotatably accommodates the rotor, the casing including at least one inflow side opening through which a fluid flows in from outside to the rotor accommodating space and at least one outflow side opening through which the fluid flows out from the rotor accommodating space to the outside, respectively at positions opposite to an outer circumferential surface of the rotor,
wherein the rotor is formed in a cylindrical shape having an internal space,
wherein circular end surfaces at opposing ends of the rotor are each provided with an end surface side opening that communicates with the internal space in the rotation axis direction of the rotor,
wherein the outer circumferential surface of the rotor is provided with a rotor outer circumferential opening that communicates with one opening of the at least one inflow side opening and the at least one outflow side opening of the casing when arranged opposite to the one opening and a rotor outer circumferential blocking surface that blocks the one opening when arranged opposite to the one opening, wherein a first interval is formed between the outer circumferential surface of the rotor and an inner circumferential surface of the casing that opposes the outer circumferential surface of the rotor, the first interval excluding the one opening that is blocked by the rotor outer circumferential blocking surface of the rotor, such that the fluid can flow through the first interval, wherein a second interval is formed between the circular end surface at one end of the rotor and the casing such that the fluid can flow in from the end surface side opening to the rotor or can flow out from the rotor, and wherein a third interval is formed between the circular end surface at the other end of the rotor and the casing such that the fluid can flow in from the end surface side opening to the rotor or can flow out from the rotor.

2. The rotary valve according to claim 1, wherein the rotor outer circumferential blocking surface blocks the at least one outflow side opening, and the at least one inflow side opening has an area larger than an area obtained by projecting the rotor onto the inflow side opening and is opened in a normal state regardless of a rotation angle of the rotor.

3. The rotary valve according to claim 2, wherein the casing includes one inflow side opening and two outflow side openings, and the rotor outer circumferential opening has a length in a circumferential direction configured to open the two outflow side openings at the same time and the rotor outer circumferential blocking surface has a length in a circumferential direction configured to close the two outflow side openings at the same time.

4. The rotary valve according to claim 3, wherein the rotor outer circumferential blocking surface is configured to close only one of the two outflow side openings when the rotor is rotated to a corresponding position within the casing.

5. The rotary valve according to claim 4, wherein when the rotor is rotated to the corresponding position within the casing, a boundary part of the rotor between the rotor outer circumferential opening and the rotor outer circumferential blocking surface is disposed between the two outflow side openings.

6. The rotary valve according to claim 1, wherein a length of the rotor outer circumferential opening along a circumferential direction of the outer circumferential surface of the rotor is substantially half of a length of an entire circumference of the outer circumferential surface of the rotor, and a length of the rotor outer circumferential blocking surface along the circumferential direction of the outer circumferential surface of the rotor is substantially half of the length of the entire circumference of the outer circumferential surface of the rotor.

7. A vehicle comprising:

the rotary valve according to claim 1; and an engine connected to the flow passage for circulating the fluid.

* * * * *